(12) United States Patent
Derneryd et al.

(10) Patent No.: US 9,859,959 B2
(45) Date of Patent: Jan. 2, 2018

(54) METHOD FOR ALIGNMENT OF MULTI-BEAM ANTENNAS IN A NON LINE-OF-SIGHT SCENARIO

(71) Applicant: TELEFONAKTIEBOLAGET L M ERICSSON (PUBL), Stockholm (SE)

(72) Inventors: Anders Derneryd, Göteborg (SE); Jan-Erik Berg, Sollentuna (SE); Ulrika Engström, Floda (SE); Lars Manholm, Göteborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1 day.

(21) Appl. No.: 14/764,825

(22) PCT Filed: Feb. 1, 2013

(86) PCT No.: PCT/EP2013/051998
§ 371 (c)(1),
(2) Date: Jul. 30, 2015

(87) PCT Pub. No.: WO2014/117855
PCT Pub. Date: Aug. 7, 2014

(65) Prior Publication Data
US 2015/0365141 A1    Dec. 17, 2015

(51) Int. Cl.
*H04B 7/04* (2017.01)
*H01Q 3/26* (2006.01)
(Continued)

(52) U.S. Cl.
CPC .......... *H04B 7/0408* (2013.01); *G01S 3/38* (2013.01); *G01S 17/88* (2013.01); *H01Q 3/24* (2013.01);
(Continued)

(58) Field of Classification Search
CPC combination set(s) only.
See application file for complete search history.

(56) References Cited

U.S. PATENT DOCUMENTS 5,051,753 A * 9/1991 Haruyama .......... G01S 13/4409
342/158
5,418,539 A * 5/1995 Sezai .................. H01Q 21/296
342/157
5,448,247 A * 9/1995 Sezai .................. H01Q 21/296
342/378

(Continued)

FOREIGN PATENT DOCUMENTS

EP        1659813 A1    5/2006

OTHER PUBLICATIONS

Shelton et al. "Multiple Beams from Linear Arrays" IRE Transactions On Antennas And Propagation, 1961, pp. 154-161.

*Primary Examiner* — Nay A Maung
*Assistant Examiner* — Erica Fleming-Hall
(74) *Attorney, Agent, or Firm* — Patent Portfolio Builders, PLLC

(57) ABSTRACT

The present invention relates to a method for alignment of a first node with at least one secondary node in a wireless communication network. The first node includes first node antenna beams with corresponding designated pointing angles. For each such beam, the method comprises the steps of, for each secondary node: directing a first node antenna beam in its designated pointing angle; using a secondary node antenna beam where objects can generate signal reflections/diffractions; and detecting at least one signal property of reflected/diffracted signals. The method further comprises the steps: exchanging information between the nodes, regarding beam angles resulting in said signal property exceeding a corresponding threshold level; and selecting a first node beam angle and a secondary node beam angle from the beam angles for communication between the first node and each secondary node.

11 Claims, 3 Drawing Sheets

(51) Int. Cl.
*H01Q 3/24* (2006.01)
*G01S 3/38* (2006.01)
*H04B 7/0408* (2017.01)
*G01S 17/88* (2006.01)

(52) U.S. Cl.
CPC ...... *H01Q 3/2605* (2013.01); *G01S 2205/007* (2013.01)

(56) References Cited

U.S. PATENT DOCUMENTS

| | | | |
|---|---|---|---|
| 7,680,517 B2* | 3/2010 | Uno | H04B 7/0408 343/702 |
| 2004/0066325 A1* | 4/2004 | Zoratti | G01S 7/4026 342/165 |
| 2006/0116092 A1* | 6/2006 | Uno | H04B 7/0408 455/134 |
| 2007/0230639 A1* | 10/2007 | Stirling-Gallacher | H04B 7/0408 375/347 |
| 2008/0248802 A1* | 10/2008 | Krishnamoorthy | H01Q 3/2605 455/445 |
| 2011/0110453 A1* | 5/2011 | Prasad | H04B 7/0695 375/285 |
| 2012/0106474 A1* | 5/2012 | Wu | H04B 7/0619 370/329 |
| 2013/0002487 A1* | 1/2013 | Hosoya | H04B 7/0617 342/372 |
| 2013/0331081 A1* | 12/2013 | Rune | H04B 7/0408 455/418 |
| 2014/0187174 A1* | 7/2014 | Safavi | H04B 7/0413 455/73 |

* cited by examiner

METHOD FOR ALIGNMENT OF MULTI-BEAM ANTENNAS IN A NON LINE-OF-SIGHT SCENARIO

CROSS REFERENCE TO RELATED APPLICATION(S)

This application is a 35 U.S.C. §371 National Phase Entry Application from PCT/EP2013/051998, filed Feb. 1, 2013, designating the United States, the disclosure of which is incorporated herein in its entirety by reference.

TECHNICAL FIELD

The present invention relates to a method for alignment of a first node with at least one secondary node in a wireless communication network. The first node is adapted to direct a plurality of first node antenna beams at corresponding designated first node antenna beam pointing direction angles. For each desired first node antenna beam, the method comprises the step of, for each secondary node, directing a first node antenna beam in its designated pointing direction.

BACKGROUND

It is desired to acquire a high degree of capacity in wireless communication networks. One technique to increase capacity in a wireless communication network is to deploy low power pico radio base stations within macro cell coverage areas forming a heterogeneous network. Pico base stations are smaller than regular macro base stations, and cover smaller areas, and are in many cases placed close to street level and a backhaul aggregation point is usually placed at macro base stations above rooftop level.

Traditional backhaul technologies for establishing a connection between pico base stations and a backhaul aggregation point are line-of-sight radio links. However, when the backhaul aggregation points are placed above rooftop level while the pico base stations are below the roof, closer to the street level, line-of-sight (LOS) may be prevented such that a none line-of-sight (NLOS) scenario exists. Then, one cannot align the radio link backhaul antenna beams at the macro base station and the radio link backhaul antenna beam at the pico base station towards each other by means of visual inspection and manual adjustment. Traditionally, backhaul connection has then been solved by using for example copper wires or optical fiber wires.

However, the traditional backhaul technologies discussed above do not always fit a heterogeneous backhaul scenario. High gain, narrow beam antennas are desired in wireless backhaul applications to connect for example a fixed backhaul aggregation point at a macro base station with a fixed pico base station in a heterogeneous network scenario. In order to cover a number of pico base stations, the macro sites need to be equipped with one antenna for each pico base station to connect. This is undesirable due to visual impact as well as economical reasons. Wireless NLOS backhaul radio links equipped with multi-beam antennas have then been proposed as an alternative.

Aligning sensor antennas, using a multi-beam antenna in free space, is for example described in US 2004/0066325 where a wide beam antenna at a central node is used to cover a broad sector containing a number of remote nodes. The antenna alignment is relatively easy to perform since there is a visual connection between the nodes.

However, how to simultaneously align multi-beam and narrow beam radio link antennas is not taught, and there is thus a need for such a method.

SUMMARY

It is an object of the present invention to provide a method for aligning multi-beam and narrow beam radio link antennas.

Said object is obtained by means of a method for alignment of a first node with at least one secondary node in a wireless communication network. The first node is adapted to direct a plurality of first node antenna beams at corresponding designated first node antenna beam pointing direction angles. For each desired first node antenna beam, the method comprises the steps of, for each secondary node:
directing a first node antenna beam in its designated pointing direction;
using a secondary node antenna beam for scanning a volume with at least one object, said object being able to generate signal reflections and/or signal diffractions; and
detecting at least one signal property of reflected signals and/or diffracted signals.

The method further comprises the steps:
exchanging information between the nodes, said information comprising first node antenna beam pointing direction angles and secondary node antenna beam pointing direction angles resulting in said signal property exceeding a corresponding threshold level; and
selecting a first node antenna beam pointing direction angle and selecting a secondary node antenna beam pointing direction angle from the antenna beam pointing direction angles comprised in said exchanged information for communication between the first node and each secondary node.

According to an example, the method comprises the steps of each secondary node sequentially using its secondary node antenna beam for scanning said volume for a certain first node antenna beam; and the first node switching to another first node antenna beam, until the desired first node antenna beams have been used.

Alternatively, the method comprises the steps of all secondary nodes using their corresponding secondary node antenna beams for scanning said volume for a certain first node antenna beam at the same time; and the first node switching to another first node antenna beam, until the desired first node antenna beams have been used.

According to another example, that all secondary nodes are in receive mode and each secondary node detects signals transmitted by the first node.

Alternatively, all secondary nodes are in transmit mode and the transmitted signals are differentiated such that the first node can identify each secondary node individually.

According to another example, said information comprises measures of said signal property.

According to another example, the method comprises the step of saving the exchanged information, at least at the first node.

More examples are disclosed in the dependent claims.

A number of advantages are obtained by means of the present invention. For example:
A self-alignment method is used to select narrow beams at a first node (aggregation point) and antenna beam directions at the secondary nodes.
No special equipment is necessary to align the antenna beams.

Simplified deployment; alignment is remotely controlled, which reduces time needed for on-site work.

BRIEF DESCRIPTION OF THE DRAWINGS

The present invention will now be described more in detail with reference to the appended drawings, where.

DETAILED DESCRIPTION

Figure 1:
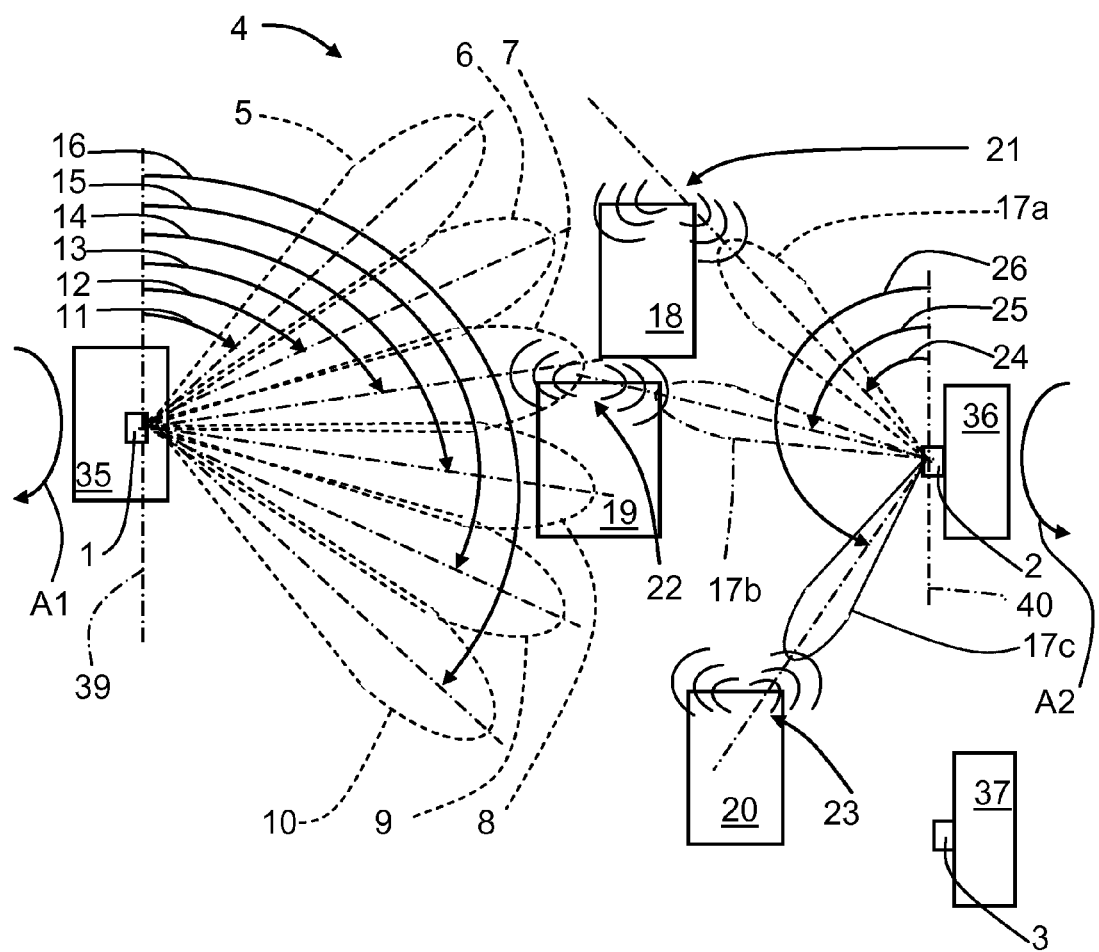
FIG. 1 shows a schematic top view of a wireless communication network.
Figure 2:
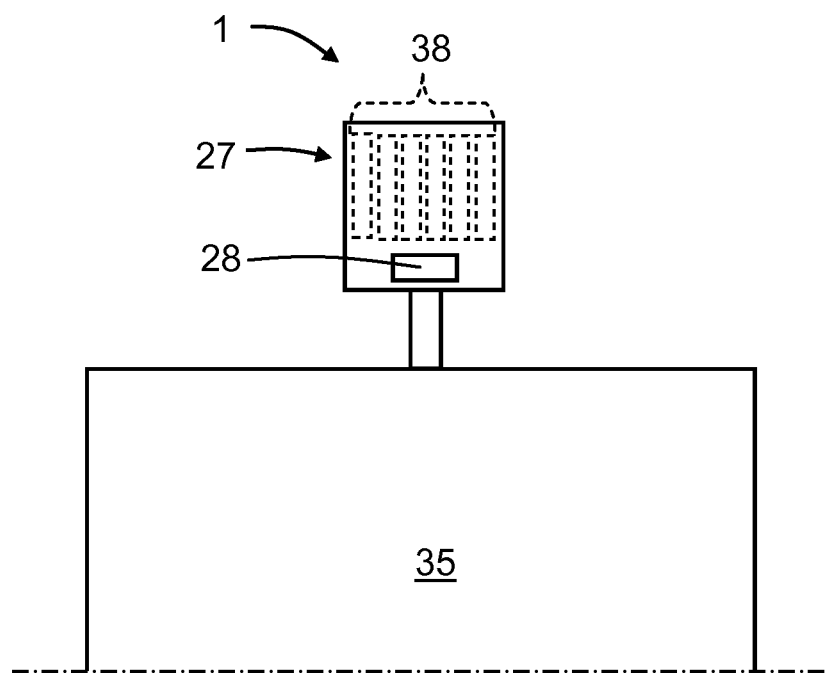
FIG. 2 shows a schematic front view of a first node with its antenna arrangement.

With reference to FIG. 1 and FIG. 2, there is a first node 1 which is positioned on the top of a first building 35 and is comprised in a wireless communication network 4. In this example, the first node 1 is constituted by a backhaul aggregation point at a macro site. The wireless communication network 4 further comprises a first secondary node 2 and a second secondary node 3 positioned at corresponding second and third buildings 36, 37 such that there is no line-of-sight between the first node 1 and any of the secondary nodes 2, 3. In this example, the secondary nodes 2, 3 are positioned closer to a ground level than the first node 1; for example the first node is positioned at a level of 20-30 meters above the ground and the secondary nodes 2, 3 are positioned at a level of 2-10 meters above the ground.

Furthermore, there is a fourth building 18, fifth building 19 and sixth building 20 positioned between the first node 1 and the secondary nodes 2, 3. When signals are transmitted from the nodes, these buildings 18, 19, 20 give rise to signal reflections and/or signal diffractions 21, 22, 23, primarily at the edges of these buildings 18, 19, 20.

The first node 1 comprise an antenna arrangement 27 that comprises a plurality of vertically arranged antenna columns 38 which are connected to a passive beam forming network 28. The antenna arrangement 27 is adapted to direct a first node first antenna beam 5, a first node second antenna beam 6, a first node third antenna beam 7, a first node fourth antenna beam 8, a first node fifth antenna beam 9 and a first node sixth antenna beam 10 at corresponding designated pointing direction angles 11, 12, 13, 14, 15, 16 in an azimuth direction A. These antenna beams 5, 6, 7, 8, 9, 10 have a relatively narrow beamwidth in the azimuth direction A1, for example a typical half-power beamwidth is of the magnitude 15°.

The pointing direction angles are defined relative a first node antenna plane 39 that runs perpendicular to a pointing direction straight forward from the antenna arrangement 27.

The beam-forming network 28 is for example in the form of a Butler matrix, in this example having six beam ports and six antenna ports. Each antenna column is connected to a corresponding antenna port to generate said antenna beams.

In the following, an alignment process will be described between the first node 1 and the first secondary node 2, and more briefly between the first node 1 and the second secondary node 3. It is to be understood that this process may be repeated for each secondary node in question for alignment in the wireless communication network 4.

The alignment process, which for example may be run during backhaul installation, starts with that the first node 1 transmits using its first antenna beam 5, where the fourth building 18, fifth building 19 and sixth building 20 then give rise to the previously mentioned corresponding signal reflections and/or signal diffractions 21, 22, 23.

Then, according to the present invention, the first secondary node 2 uses a secondary node antenna beam 17a, 17b, 17c for scanning a volume, where the scan for example may be performed mechanically, electronically or both mechanically and electronically. The secondary node antenna beam 17a, 17b, 17c is in FIG. 1 shown at three different scan pointing direction angles 24, 25, 26. As for the first node, the pointing direction angles are defined relative a first secondary node antenna plane 40. Also, as for the first node antenna beams 5, 6, 7, 8, 9, 10, the secondary node antenna beam 17a, 17b, 17c has a relatively narrow beamwidth in the azimuth direction A2.

During the scan, the signal levels are detected, and in the environment disclosed, the main signals are the reflected signals and/or diffracted signals 21, 22, 23. During the scan, the scan pointing direction angles 24, 25, 26 that result in signal levels exceeding a certain threshold level are recorded and stored. The scan continues until no further diffraction/reflection points are found with a signal level above the threshold level.

Then the first node starts to transmit using its second antenna beam 6 and the first secondary node 2 uses the secondary node antenna beam 17a, 17b, 17c for performing a new scan in the same way as for the first node first antenna beam 5. This procedure continues until no further diffraction/reflection points are found between the first node 1 and the first secondary node 2 using all first node antenna beams 5, 6, 7, 8, 9, 10. The alignment procedure is then completed using the first secondary node 2.

The alignment continues with the second secondary node 3 in the same way as with the first secondary node 2. Then information is exchanged between the nodes 1, 2, 3, said information comprising all pointing direction angles 11, 12, 13, 14, 15, 16, 24, 25, 26 resulting in signal levels exceeding the threshold level. Said pointing direction angles 11, 12, 13, 14, 15, 16, 24, 25, 26 include scan pointing direction angles 24, 25, 26 at the secondary nodes 2, 3 as well as corresponding first node beam pointing direction angles 11, 12, 13, 14, 15, 16. These pointing direction angles 11, 12, 13, 14, 15, 16, 24, 25, 26 are used when selecting first node antenna beams and antenna beam directions for the secondary nodes 2, 3.

The information preferably also comprises the signal levels that are detected at the pointing direction angles 11, 12, 13, 14, 15, 16, 24, 25, 26. For example, for each certain first node antenna beam pointing direction angle that, in combination with a certain secondary node antenna beam pointing direction angle, results in a signal level exceeding the threshold level, the information comprises these angles together with the resulting signal level.

Backhaul communication thus starts with data transmission between the nodes 1, 2, 3 using selected first node beams 5, 6, 7, 8, 9, 10 pointing in the direction of secondary node diffraction/reflection points 21, 22, 23 with signal strength exceeding the threshold level, recorded and stored during the alignment process. Only the selected first node antenna beams pointing towards secondary nodes 2, 3 are used.

Coarse alignment of the antenna beams during installation can be performed using:

Visual inspection of the scenario to find a probable diffraction/reflection point;

Means mounted on the antennas to transmit a light or laser beam towards a probable diffraction/reflection point visible from both nodes; and/or Using known positions of the first node and each secondary node to calculate beam directions towards a probable common diffraction/reflection point.

The alignment can be:

Automatic by setting the equipment in an alignment mode during installation that switches to an operation mode when alignment is completed; and/or Supported by a communication link via the wireless communication network 4 or other available means such as the cellular network.

The term "signal level" that has been used above is an example. Many other parameters than signal level can be monitored during the alignment process for example:

Bit-error rate (BER);
Signal to noise and interference ratio (SNIR);
Signal to interference ratio (SIR);
Signal to noise ratio (SNR);
Block Error Rate (BLER);
Re-transmission frequency;
Channel Quality Indicator (CQI) and/or
Received Signal Strength Indicator (RSSI).

Generally, the parameters above constitute signal properties, and in the method according to the present invention, at least one signal property is detected. Each threshold level is adapted for the signal property in question.

The signal level in the communication links may be improved by:

More accurately determining the directions towards secondary nodes seen from the first node by comparing received signal levels in two adjacent beams;

Optimizing the first node's beam directions towards the secondary nodes;

Scanning the first node antenna beams slightly using phase shifters in the feed lines between the antenna columns 38 and the Butler matrix 28 at the first node;

Changing the polarizations;

Changing the bandwidth and the center frequency used; and/or

Using coded and appropriately modulated signals.

The alignment of the secondary nodes 2, 3 can be:

Sequential;

Simultaneous, where all secondary nodes 2, 3 are in receive mode and each secondary node tries to detect the signal transmitted by the first node 1; and/or Simultaneous, where all secondary nodes 2, 3 are in transmit mode and the transmitted signal are differentiated by frequency, code or any other means, so that the first node 1 can identify the secondary nodes.

Figure 3:
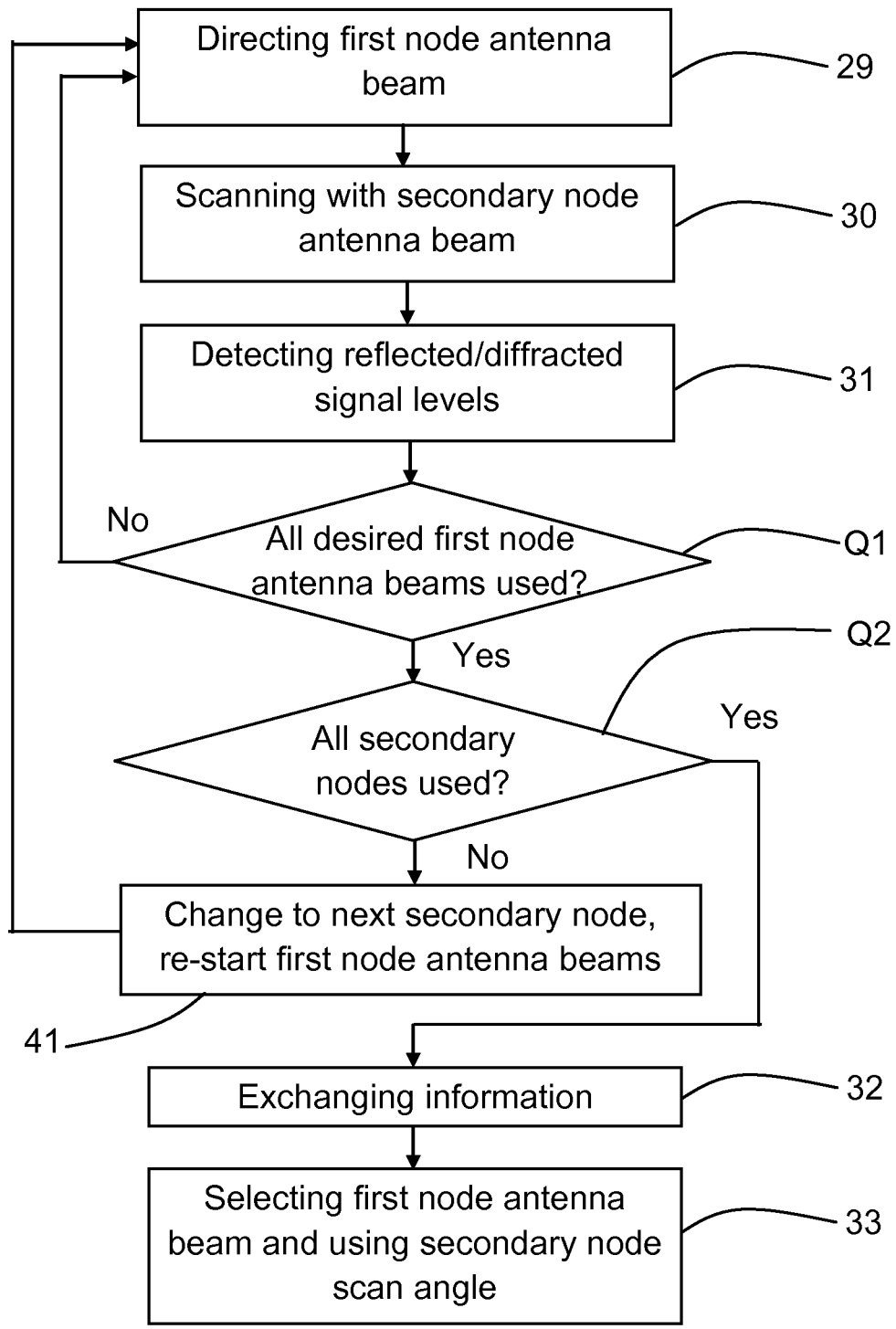
FIG. 3 shows a flow chart of a method according to the present invention.

In general, with reference to FIG. 1 and FIG. 3, the present invention relates to a method for alignment of a first node 1 with at least one secondary node 2, 3 in a wireless communication network 4. The first node 1 is adapted to direct a plurality of first node antenna beams 5, 6, 7, 8, 9, 10 at corresponding designated first node antenna beam pointing direction angles 11, 12, 13, 14, 15, 16. For each desired first node antenna beam 5, 6, 7, 8, 9, 10, the method comprises the following three steps for each secondary node 2, 3:

29: directing a first node antenna beam 5, 6, 7, 8, 9, 10 in its designated pointing direction;

30: using a secondary node antenna beam 17a, 17b, 17c for scanning a volume with at least one object 18, 19, 20, said object 18, 19, 20 being able to generate signal reflections and/or signal diffractions 21, 22, 23; and

31: detecting at least one signal property of reflected signals and/or diffracted signals 21, 22, 23.

These three steps are repeated Q1 for every desired first node antenna beam 5, 6, 7, 8, 9, 10. When all desired first node antenna beam 5, 6, 7, 8, 9, 10 have been run through, if there are more secondary nodes Q2, a change 41 to the next secondary node is performed, and a restart 41 is made for the desired first node antenna beams 5, 6, 7, 8, 9, 10.

The method further comprises the step:

32: exchanging information between the nodes 1, 2, 3, said information comprising first node antenna beam pointing direction angles 11, 12, 13, 14, 15, 16 and secondary node antenna beam pointing direction angles 24, 25, 26 resulting in said signal property exceeding a corresponding threshold level;

which method step 32 may be performed at one or several occasions during running the first three method steps, for example after having completed each secondary node or after having completed all secondary nodes. The latter of these examples is illustrated in FIG. 3.

The method further comprises the step:

33: selecting a first node antenna beam pointing direction angle 11, 12, 13, 14, 15, 16 and selecting a secondary node antenna beam pointing direction angle 24, 25, 26 from the antenna beam pointing direction angles 11, 12, 13, 14, 15, 16, 24, 25, 26 comprised in said exchanged information for communication between the first node 1 and each secondary node 2, 3.

The final method step 33 is performed when communication between the nodes is started, using the results of the previous method steps 29, 30, 31, 32

The method is applicable for any number of secondary nodes.

The present invention is not limited to the above, but may vary within the scope of the appended claims. For example, which nodes that are transmitting and which nodes that are receiving during the alignment may be switched.

The information that is exchanged between the nodes 1, 2, 3 may comprise measures of said signal property.

The antenna arrangement 27 at the aggregation point of the first node 1 can be implemented using a number of antennas integrated in the same unit.

The number of ports of the beam-forming network, the number of antenna columns 38 and the number of first node antenna beams may vary. Furthermore, not all first node antenna beams available have to be used.

The passive beam forming network can be a Rothman lens, Blass matrix or in the form of a phased array.

The secondary nodes may be any sort of nodes, but may mainly be constituted by smaller types of base stations such as a so-called pico base station or similar. There may be any number of secondary nodes.

The first node 1 is in the example constituted by a backhaul aggregation point at a macro site. The first node may be any sort of node, where the present invention generally refers to antenna alignment between any two nodes. The present invention does not require non line-of-sight for all antenna beams, but also works for antenna beams in the wireless communication network 4 where line-of-sight exists.

The order of certain events above may be altered within the scope of the present invention. For example, information may be exchanged between the nodes 1, 2, 3 for all secondary nodes at the same time, when the alignment procedure has been performed for all secondary nodes, or for each secondary node one at a time, when the alignment procedure has been performed for that secondary node.

Each antenna beam pointing direction angle 11, 12, 13, 14, 15, 16, 24, 25, 26 comprised in said exchanged information may either be identified by a specific angular measure or by an identification reference such as a letter or a digit.

The present invention is not limited to searching in the azimuth plane only but can also be extended to searching in both azimuth and elevation planes.

The invention claimed is:

1. A method for alignment of a first node with at least one secondary node in a wireless communication network, the first node being adapted to direct a plurality of first node antenna beams at corresponding designated first node antenna beam pointing direction angles, wherein for each desired first node antenna beam, the method comprises, for each secondary node:

directing a first node antenna beam in its designated pointing direction;

using a secondary node antenna beam generated by the secondary node for scanning a volume of signal reflections and/or signal diffractions generated due to reflection and/or diffraction of the first node antenna beam with at least one object between the first node and the secondary node, wherein the scanning includes detecting at least one signal property of the reflected signals and/or diffracted signals, and storing secondary node antenna beam pointing direction angles that result in the at least one signal property of the reflected signals and/or diffracted signals exceeding a corresponding threshold level;

wherein the method further comprises:

exchanging information between the nodes, said information comprising first node antenna beam pointing direction angles and the secondary node antenna beam pointing direction angles resulting in said signal property exceeding the corresponding threshold level; and selecting a first node antenna beam pointing direction angle and selecting a secondary node antenna beam pointing direction angle from the antenna beam pointing direction angles comprised in said exchanged information for communication between the first node and each secondary node.

2. The method according to claim 1, further comprising the steps of:

each secondary node, sequentially using its secondary node antenna beam for scanning said volume for a certain first node antenna beam; and the first node switching to another first node antenna beam, until the desired first node antenna beams have been used.

3. The method according to claim 1, further comprising the steps of:

all secondary nodes using their corresponding secondary node antenna beams for scanning said volume for a certain first node antenna beam at the same time; and the first node switching to another first node antenna beam, until the desired first node antenna beams have been used.

4. The method according to claim 1, wherein all secondary nodes are in receive mode and each secondary node detects signals transmitted by the first node.

5. The method according to claim 1, wherein all secondary nodes are in transmit mode and the transmitted signals are differentiated such that the first node can identify each secondary node individually.

6. The method according to claim 1, wherein the first node comprises an antenna arrangement that in turn comprises a beam-forming network in the form of a Butler matrix, a Rothman lens, a Blass matrix or a phased array.

7. The method according to claim 1, wherein the first node comprises an antenna arrangement that is adapted for digital beamforming.

8. The method according to claim 1, wherein said information comprises measures of said signal property.

9. The method according to claim 1, wherein said signal property includes at least one of relative signal strength, Signal to interference ratio, SIR, Signal to noise and interference ratio, SNIR, Signal to noise ratio, SNR, Bit Error Rate, BER, Block Error Rate, BLER, Channel Quality Indicator, CQI, Received Signal Strength Indication, RSSI, and re-transmission frequency.

10. The method according to claim 1, wherein the method comprises the step of saving the exchanged information, at least at the first node.

11. The method according to claim 1, wherein each antenna beam pointing direction angle comprised in said exchanged information is identified either by a specific angular measure or by an identification reference.

* * * * *